United States Patent Office 3,062,680
Patented Nov. 6, 1962

3,062,680
HYDROGENATION CATALYSTS FOR REDUCING REACTIONS
Basil Meddings, Fort Saskatchewan, Alberta, Canada, assignor to Sherritt Gordon Mines Limited, Toronto, Ontario, Canada, a company of Ontario
No Drawing. Filed June 20, 1960, Ser. No. 37,047
6 Claims. (Cl. 117—100)

This invention relates to hydrogenation catalysts for reducing reactions. It is particularly directed to the use of a member selected from the group consisting of anthraquinone, substituted anthraquinones, benzoquinone, naphthoquinone and ortho- and para-polyhydric phenols such as pyrogallol, tannic acid, and morin, as hydrogenation catalysts in the precipitation of a metal of the group silver, copper, nickel and cobalt from an aqueous solution in which the metal is present as a dissolved salt by reacting the solution with a reducing gas at elevated temperature and pressure.

Processes are known in which a metal, having an oxidation-reduction potential between that of silver and cadmium inclusive and which is capable of forming with ammonia in aqueous solution a complex cation the salt of which is more soluble than is the metal in elemental form, can be precipitated in elemental form from a solution in which it is present as a dissolved salt by reacting the solution with a reducing gas at elevated temperature and pressure.

It is known, also, that the presence, in the solution, of a minor amount of a catalyst or nucleation promoter, aids in the initiation of and serves to promote the reducing reaction and the precipitation of the desired metal in the form of finely divided metal particles.

It is known, also, that metal, present in a solution as a dissolved salt, can be precipitated therefrom as a film or coating of metal in elemental form on surfaces of solid particles of foreign material present in the solution subjected to the reducing reaction. This development is of substantial importance in the art as it provides a relatively inexpensive procedure for forming a metal coating on surfaces of bodies of foreign materials dispersed in the solution subjected to treatment. The process is independent of the surfaces which are to be coated with precipitated metal. The solids dispersed or suspended in the solution can be finely divided particles or large bodies. They can be formed of metal which is different from that to be precipitated from the solution, metal alloy, metal compounds, such as, for example, metal carbides, metal oxides, metal nitrides and the like, or they can be formed of non-metals or non-metal compounds such as, for example, diamonds, graphite, silicon, glass, plastics and the like.

Problems are encountered in the precipitation of metals from solutions by reaction with a reducing gas. It is difficult to initiate the reducing reaction, particularly in the treatment of solutions which contain dissolved salts of nickel and cobalt. Thus, catalysts or nucleation promoters are required to initiate and promote the reducing reaction. In a commercial operation, the nucleation promoter adds to the overall cost and, also, it may contaminate the product metal. Also, precipitated metals tend to deposit on and adhere to the walls of the reaction vessel and the agitator assembly in the form of a tightly adhering film or coating which is difficult to remove. These problems are particularly acute in the production of composite, metal coated products in which metal, in elemental form, is precipitated from the solution on solid bodies of foreign matter which are dispersed in the solution.

We have found that the problems in the production of metals of the group silver, copper, nickel and cobalt, of rapidly initiating the reducing reaction and precipitating the desired metals as extremely finely divided particles can be overcome by providing in the solution subjected to reaction with the reducing gas, a small amount of a member of the group consisting of anthraquinone and substituted anthraquinones. This group includes, but is note necessarily limited to, anthraquinone, alizarin, quinalizarin, $\alpha$ and $\beta$ sodium sulphonate alizarin, 1- and 2-amino anthraquinone, and other substituted anthraquinones. This is the preferred group of addition agents. However, satisfactory results have been obtained also from the use of benzoquinone, naphthoquinone, ortho- and para-polyhydric phenols such as pyrogallol and tannic acid, and morin. This group is referred to hereinafter as "the defined group." The addition agent can be used alone, but the best results are obtained when it is used with an added catalyst or nucleation promoter.

Anthraquinone is a well known compound. It has the molecular formula $C_6H_4(CO)_2C_6H_4$. It can be produced by oxidizing anthracene with alkali bichromate or by heating phthalic anhydride and benzene in the presence of aluminum chloride and dehydrating the product. It is normally used as an intermediate for dyes and organics and as an organic inhibitor.

It is now well known that a metal of the group silver to cadmium inclusive in the electrochemical series of the elements, which is capable of forming a soluble ammine complex, can be precipitated from a solution in which it is present as a dissolved salt by reacting the solution with a reducing gas, such as hydrogen, at elevated temperature and pressure.

Metals nearer the negative end of the series, such as silver and copper, precipitate readily from the solution under relatively moderate temperature and pressure conditions. Thus, usually, no catalyst is necessary to initiate and promote the reaction although usually it is desirable to provide an agent in the solution subjected to the reducing reaction which inhibits the agglomeration of metal particles and plastering on the walls of the reaction vessel. Nickel and cobalt, which are nearer to the positive end of the series, require higher temperatures and pressures and, in order to obtain a satisfactory reaction rate and a product of satisfactory particle size, it is necessary to provide, in the solution, a catalyst or a nucleating agent which forms finely divided nuclei on which metal can deposit and grow as the reducing reaction proceeds. There are now many known agents which are useful for this purpose. We have found, however, the presence in the solution of at least one compound selected from the group defined above, whether used as an addition agent alone or in combination with a known catalyst or nucleation promoter, is particularly effective in improving the precipitation of nickel from the solution. We have found, also, that the presence of at least one compound of the defined group produces greatly improved results in coating precipitated metal on to surfaces of different materials present in the solution subjected to the reducing reaction. Metal coatings can be produced which are of substantially uniform thickness and density. This is of particular importance in coating particles to be used in the manufacture of dispersion hardened alloys, and in coating graphite, diamonds, glass and like materials which require metal coatings for specific purposes.

The conditions under which the reducing reaction is conducted are known. The metal to be precipitated is in the form of a compound which is soluble in the solution subjected to the reducing reaction. It may be in the form of a salt of an acid, preferably the sulphate, carbonate or acetate salt. The amount of metal salt dissolved in the solution is not critical, although it usually is preferred to employ a minimum concentration above that at which the process can be conducted as an economically practical operation. The maximum concentration usually is safely below that at which there would be precipitation of the salt from the solution by crystallization. Suggested concentrations of nickel and cobalt are, initially, from 30 to 60 grams per litre of solution. Suggested concentrations of copper and silver are from 60 to 120 grams per litre of solution.

The temperature at which the reducing reaction is conducted is above 100° C. and, preferably, within the range of from 150° to 300° C. The total pressure at which the reaction is conducted is determined by the pressure autogenously developed by the temperature plus the partial pressure of the reducing gas. The reaction can be conducted under a partial pressure of as low as 50 pounds per square inch but the reaction proceeds slowly. Higher pressures are preferred. A preferred partial pressure of reducing gas is within the range of from 100 to 500 pounds per square inch.

Higher temperatures and pressures can be employed, of course, but the increased reaction rate obtained does not warrant the increased capital and operating costs inherent in the use of costly, high pressure equipment. An important advantage of the addition to the solution of a small amount of anthraquinone or a substituted anthraquinone or another member of the defined group of compounds is the realization of a rapid reaction rate without the use of high temperature and pressure.

Optimum results are obtained when the reducing reaction is conducted with a solution pH value within the range of from 2 to 9. The reaction is acid forming. That is, for each mole of metal precipitated, a mole of acid is formed. Thus, it is necessary to provide, in the solution, either initially or during the course of the reaction, sufficient neutralizing agent in the solution to maintain the pH value above the predetermined minimum, preferably approximate to that value at which optimum results are obtained, having regard to the solution subjected to treatment. Sodium hydroxide, NaOH, or ammonia, NH$_3$, are suitable neutralizing agents, of which ammonia may be preferred as it forms an ammonium salt which may have a market value when recovered from the end solution. Theoretically, two moles of these neutralizing agents are required per mole of metal precipitated to combine with the released acid radicals to form sodium or ammonium salts, for example, sodium or ammonium carbonate or sulphate, Na$_2$CO$_3$, Na$_2$SO$_4$, (NH$_4$)$_2$CO$_3$ or (NH$_4$)$_2$SO$_4$. Preferably, a slight excess of neutralizing agent is provided.

We have found that improved results are obtained when as little as from 0.01 to 0.05 gram per litre of anthraquinone, or equivalent amounts of another member of the defined group, is provided in the solution subjected to the reducing reaction. Greater amounts, for example up to 1 gram per litre or more, can be provided if desired. However, carbon contained in the added compound may contaminate the purity of the desired metal product and although it can be removed in subsequent treatment of the metal or metal coated product, it may be preferred not to use an amount in excess of that required to obtain optimum results. Very satisfactory results have been obtained by the addition of from 0.02 to 1 gram of anthraquinone or other member of the defined group per litre of solution.

The following examples illustrate the improved results which can be obtained in the precipitation of nickel in elemental form from a solution in which it is present as a dissolved salt by providing in the solution as catalyst, a minor amount of a member of the defined group and thereafter reacting the solution with a sulphur free reducing gas at elevated temperature and pressure. In each example, nickel ammonium sulphate was dissolved in water. Ammonia was added to the solution to produce a ratio of 2.2 moles of ammonia per mole of nickel. The addition agent was added to the solution. The solution was then heated to reaction temperature, 350° F., in the absence of hydrogen. Hydrogen was introduced into the solution at reaction temperature and the reaction was conducted under a partial pressure of hydrogen of 350 pounds per square inch.

The results obtained by the use as catalysts of members of the defined group are set out in Table I.

*Table 1*

| Added compound | Amount g.p.l. | Volume of solution (litres) | Reduction time, mins. | Nickel content g.p.l. Start | Nickel content g.p.l. End | Percent Ni recovered as powder | Powder analysis Percent Fe | Powder analysis Percent S | Powder analysis Percent C | Apparent density gm./cc. | Size microns |
|---|---|---|---|---|---|---|---|---|---|---|---|
| Hydroquinone | 1.0 | 2.0 | >10->40 | 50.0 | 0.64 | 66 | 0.01 | 0.004 | 0.019 | (¹) | 29.5 |
| Anthraquinone | 1.0 | 2.0 | <5 | 50.0 | 0.2 | 84 | 0.19 | 0.014 | 0.30 | 1.56 | 14.0 |
| Benzoquinone | 1.0 | 2.0 | 12 | 50.0 | 0.80 | 82 | 0.02 | 0.010 | 0.26 | 1.40 | 6.5 |
| Do | 0.2 | 8.0 | 15 | 36.8 | 1.0 | 83.0 | 0.006 | 0.011 | 0.21 | 3.41 | 36.0 |
| Pyrogallol 250° F | 1.0 | 2.0 | >40->60 | 50.0 | 0.4 | 66 | 0.006 | 0.009 | 0.11 | 2.08 | 10.3 |
| Pyrogallol 350° F | 1.0 | 2.0 | <12 | 50.0 | N.a. | 76 | 0.018 | 0.007 | 0.097 | 2.21 | 19.5 |
| Pyrogallol 450° F | 1.0 | 2.0 | <5 | 50.0 | <0.04 | (²) | 0.007 | 0.006 | >0.13 | 1.33 | 14.0 |
| Naphthoquinone | 0.2 | 8.0 | 45 | 34.7 | 6.6 | 6.0 | (¹) | 0.018 | 0.27 | N.a. | 55.0 |
| Anthraquinone | 0.2 | 2.5 | 12 | 47.0 | 1.0 | 94.4 | 0.009 | 0.009 | 0.10 | 0.76 | 9.2 |
| Alizarin | 0.2 | 2.5 | 25 | 40.0 | 2.0 | 53.4 | 0.004 | 0.005 | 0.26 | 2.86 | 28.5 |
| Alizarin (in C$_2$H$_5$OH) | 0.2 | 2.5 | 30 | 43.3 | 9.2 | 18.9 | 0.003 | 0.007 | 0.11 | 3.7 | 61 |
| Quinzlizarin | 0.2 | 2.5 | 30 | 38.5 | 1.4 | 23.4 | 0.005 | 0.008 | 0.13 | | 56.0 |
| Do | 0.2 | 2.5 | 12 | 41.4 | 2.0 | 70.7 | 0.002 | 0.009 | 0.082 | 2.96 | 25.6 |
| Do | 0.2 | 2.5 | 14 | 40.0 | 2.0 | 70.3 | 0.025 | 0.007 | 0.069 | 2.58 | 20.2 |
| Do | 0.2 | 2.5 | 20 | 41.0 | 0.2 | 53.0 | 0.025 | 0.007 | 0.11 | 2.63 | 45.0 |
| α-Sodium sulphonate A.Q. | 0.2 | 2.5 | 45 | 47.7 | 2.5 | 66.7 | 0.006 | 0.019 | 0.060 | 2.95 | 44.0 |
| β-Sodium sulphonate A.Q. | 0.2 | 2.5 | 30 | 39.4 | 1.1 | 19.2 | 0.005 | 0.026 | 0.013 | | 17.5 |
| β-Sodium sulphonate alizarin | 0.2 | 2.5 | 30 | 41.8 | 1.2 | 48.5 | 0.002 | 0.014 | 0.027 | 1.43 | 11.4 |
| 1-amino-anthraquinone | 0.2 | 2.5 | 12 | 47.4 | 2.5 | 83.7 | 0.002 | 0.007 | 0.066 | 2.38 | 22.0 |
| 2-amino-anthraquinone | 0.2 | 2.5 | 10 | 46.2 | 1.2 | 92.8 | 0.003 | 0.006 | 0.071 | 2.14 | 21.5 |
| Quinizarin | 0.2 | 2.5 | 30 | 47.7 | 1.0 | 70.8 | 0.02 | 0.006 | 0.042 | 3.5 | 28.9 |
| Tannic acid | 0.2 | 2.5 | 20 | 42.5 | 2.8 | 73.8 | 0.002 | 0.006 | 0.039 | 2.24 | 15.0 |
| Do | 0.2 | 2.5 | 25 | 47.4 | 4.6 | 73.6 | 0.004 | 0.007 | 0.042 | 1.82 | 15.0 |
| Morin | 0.2 | 2.5 | 35 | 48.0 | 5.7 | 78.2 | N.a. | 0.008 | 0.070 | 2.85 | 17.5 |

¹ Not determined.  ² Soft plastering.

In the operation of the process in which nickel is precipitated in elemental form from a solution in which it is present as a dissolved salt, it is desired to obtain a rapid reaction rate with maximum production of nickel of such purity in the form of finely divided particles. Referring to Table 1, it will be noted that in the use of hydroquinone, the reducing reaction was relatively slow, from 40 to 60 minutes, only 66% of the nickel was precipitated as powder and the size of the particles was 29.5 microns. In contradistinction, when using anthraquinone, from 84% to 94% of the nickel was precipitated in less than 5 to 12 minutes respectively as powder of a particle size of 14 to 9.2 microns respectively. Also, improved results were obtained by the addition to the solution of small amounts of substituted anthraquinones and other members of the defined group.

We have found, also, that still further improved results are obtained when a known catalyst or nucleation promoter is added to the solution of a compound of the defined group. This procedure has the important advantage that metal particles can be produced rapidly with minimum contamination by the addition agent or nucleation promoter and with reduced operating cost having regard to the shortened reaction time and the cost of the catalyst. The results which can be obtained in the use of a compound of the defined group with a known nucleation promoter are set out in Table II.

Table II

| Added compound, g.p.l. | Nucleation promoter,[4] g.p.l. | Volume of solution (litres) | Reduction time, mins. | Nickel content g.p.l. Start | Nickel content g.p.l. End | Percent Ni recovered as powder | Powder analysis Percent Fe | Powder analysis Percent S | Powder analysis Percent C | Apparent density gm./cc. | Size microns |
|---|---|---|---|---|---|---|---|---|---|---|---|
| [1] 1-0.2 | Ferrous sulphate, 0.1 | 8.0 | 6 | 35.4 | 0.4 | 74.0 | 0.048 | 0.035 | 0.16 | 0.38 | 3.8 |
| [2] 1-0.2 | ___do___ | 8.0 | 5 | 35.5 | 0.3 | 84.0 | 0.048 | 0.015 | 0.23 | 0.65 | 6.6 |
| [2] 1-0.02 | ___do___ | 8.0 | 14 | 39.4 | 0.8 | 73.3 | 0.036 | 0.011 | 0.090 | 3.33 | 42.0 |
| 1-0.02 | ___do___ | 8.0 | 17 | 50.8 | 0.5 | 66.6 | 0.064 | 0.011 | 0.090 | 2.49 | 24.5 |
| [3] 1-0.2 | Chromous acetate, 0.65 | 8.0 | 6 | 38.9 | 0.18 | 91.3 | 0.65 | 0.12 | 0.16 | 0.72 | 1.9 |
| 2-0.2 | Ultra-fine SiO₂, 0.4 | 2.5 | 25 | 43.5 | 5.4 | 29.0 | 0.003 | 0.012 | [5] 0.11 | 3.1 | 44.0 |
| 3-0.2 | ___do___ | 2.5 | 15 | 41.0 | 2.2 | 76.3 | 0.002 | 0.020 | 0.083 | 2.77 | 28.5 |

[1] The added compound and the nucleation promoter were injected into autoclave at 350° F.
[2] Ferrous sulphate injected into autoclave at 350° F.
[3] Chromous acetate injected into autoclave at 350° F.
[4] Nucleation promoter g.p.l.—Expressed as weight of salt per litre, i.e., 0.1 grams FeSO₄.7H₂O per litre.
[5] About.

NOTE.—1=Anthraquinone. 2=Alizarin. 3=Quinalizarin.

It will be noted by comparison of the results set out in Tables I and II that a further improved result is obtained when the anthraquinone or substituted anthraquinone is provided with a known nucleation promoter in the solution subjected to the reducing reaction. That is, a large percentage, from 74% to 91%, of the nickel content of the solution can be precipitated with from five to six minute reaction times as finely divided particles from 1.9 to 6.6 microns in size.

The use of anthraquinone, a substituted anthraquinone or another member of the defined group as an addition agent in processes in which a metal is precipitated in elemental form from a solution in which it is present as a dissolved salt by reacting the solution with a reducing gas at elevated temperature and pressure possesses many important advantages. The reducing reaction is initiated promptly on the introduction of the reducing gas and proceeds rapidly to completion. In the production of composite, metal coated bodies, the reaction can be closely controlled to produce a uniform metal coating of high density and of desired thickness on the bodies to be coated. The overall cost of operating the process is reduced as a result of the shortened reaction time and the saving in the amount of known catalyst heretofore required, and the purity of the product metal is increased by the reduction of the amount of nucleation promoter used.

What I claim as new and desire to protect by Letters Patent of the United States is:

1. In a process for the production of a metal from a solution in which it is present as a dissolved salt by reacting the solution with a reducing gas at elevated temperature and pressure, the improvement which comprises providing a member selected from the group consisting of anthraquinone, substituted anthraquinones, benzoquinone, naphtoquinone, ortho- and para-polyhydric phenols, tannic acid and morin as an addition agent in amount within the range of from about 0.01 to about 1 gram per litre in the solution subjected to the reducing reaction.

2. The process according to claim 1 in which the addition agent is provided in the solution in amount within the range of from about 0.01 gram to about 0.05 gram per litre of solution.

3. In a process for production of a metal of the group consisting of nickel and cobalt from a solution in which it is present as a dissolved salt by reacting the solution with a reducing gas at elevated temperature and pressure, the improvement which comprises the steps of providing a member selected from the group consisting of anthraquinone, substituted anthraquinones, benzoquinone, naphthoquinone, ortho- and para-polyhydric phenols, tannic acid and morin in amount within the range of from about 0.01 to about 1 gram per litre as an addition agent in the solution subjected to the reducing reaction, heating the solution to reaction temperature in the absence of reducing gas, and at reaction temperature reacting the solution with a reducing gas.

4. In a process for the production of nickel from an aqueous solution in which it is present as a dissolved salt by reacting the solution with a reducing gas at elevated temperature and pressure, the improvement which comprises providing a nucleation promoter nad a member selected from the group consisting of anthraquinone, substituted anthraquinones, benzoquinone, naphthoquinone, ortho- and para-polyhydric phenols, tannic acid and morin in amount within the range of from about 0.01 to about 1 gram per litre as an addition agent in the solution subjected to the reducing reaction.

5. In a process for forming a coating of nickel on a solid core by dispersing solid core particles in a solution in which the coating metal is present as a dissolved salt and reacting the solution with a reducing gas at elevated temperature and pressure, the improvement which comprises providing a member selected from the group consisting of anthraquinone, substituted anthraquinones, benzoquinone, naphthoquinone, ortho- and para-polyhydric phenols, tannic acid and morin in amount within the range of from about 0.01 to about 1 gram per litre as an addition agent in the solution subjected to the reducing reaction.

6. The process according to claim 5 in which a nucleation promoter is provided in the solution subjected to the reducing reaction.

References Cited in the file of this patent

UNITED STATES PATENTS

| | | |
|---|---|---|
| 2,104,501 | Adams et al. | Jan. 4, 1938 |
| 2,703,295 | Kantrowitz | Mar. 1, 1955 |
| 2,853,401 | Mackiw et al. | Sept. 23, 1958 |